United States Patent
Horikawa (10) Patent No.: US 12,531,267 B2
(45) Date of Patent: Jan. 20, 2026

(54) NEGATIVE ELECTRODE FOR LITHIUM SECONDARY BATTERY

(71) Applicant: TOYOTA JIDOSHA KABUSHIKI KAISHA, Toyota (JP)

(72) Inventor: Daisuke Horikawa, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 590 days.

(21) Appl. No.: 17/975,011

(22) Filed: Oct. 27, 2022

(65) Prior Publication Data

US 2023/0231176 A1 Jul. 20, 2023

(30) Foreign Application Priority Data

Jan. 14, 2022 (JP) ................................. 2022-004053

(51) Int. Cl.
*H01M 10/0525* (2010.01)
*H01M 50/457* (2021.01)

(52) U.S. Cl.
CPC ..... *H01M 10/0525* (2013.01); *H01M 50/457* (2021.01)

(58) Field of Classification Search
None
See application file for complete search history.

(56) References Cited

U.S. PATENT DOCUMENTS

| 2020/0343583 A1 | 10/2020 | Li et al. |
| 2020/0388821 A1 | 12/2020 | Yokoyama et al. |
| 2021/0143433 A1 | 5/2021 | Lee et al. |

FOREIGN PATENT DOCUMENTS

| JP | H08019982 A | 1/1996 |
| JP | H10178153 A | 6/1998 |
| JP | 2017-503323 A | 1/2017 |
| JP | 2018-170128 A | 11/2018 |
| JP | 2020-184513 A | 11/2020 |
| JP | 2020198260 A | 12/2020 |
| JP | 2021-77640 A | 5/2021 |
| KR | 10-2021-0050059 A | 5/2021 |
| KR | 10-2021-0147077 A | 12/2021 |
| WO | 2015/102836 A1 | 7/2015 |
| WO | 2020/219201 A1 | 10/2020 |
| WO | 2021/080052 A1 | 4/2021 |

OTHER PUBLICATIONS

Oct. 1, 2025 Office Action issued in U.S. Appl. No. 18/583,245.

*Primary Examiner* — Wyatt P McConnell
(74) *Attorney, Agent, or Firm* — Oliff PLC (57) ABSTRACT

A negative electrode for a lithium secondary battery includes a negative electrode current collector and a negative electrode layer. The negative electrode layer includes a dielectric particle and a negative electrode active material including either or both of a lithium metal and a lithium alloy.

7 Claims, 1 Drawing Sheet

NEGATIVE ELECTRODE FOR LITHIUM SECONDARY BATTERY

CROSS-REFERENCE TO RELATED APPLICATION

This application claims priority to Japanese Patent Application No. 2022-004053 filed on Jan. 14, 2022, incorporated herein by reference in its entirety.

BACKGROUND

1. Technical Field

The present disclosure relates to negative electrodes for lithium secondary batteries.

2. Description of Related Art

Among the batteries, lithium secondary batteries have been attracting attention due to their high output voltage.

Japanese Unexamined Patent Application Publication No. 2020-184513 (JP 2020-184513 A) discloses a lithium (Li) metal negative electrode battery in which a metal magnesium (Mg) layer containing metal magnesium is formed on one surface of a negative electrode current collector or one surface of a solid electrolyte layer.

Japanese Unexamined Patent Application Publication No. 2021-077640 (JP 2021-077640 A) discloses a negative electrode material that includes a metal thin film (gold (Au), magnesium (Mg), or silver (Ag)) at the interface between a Li metal layer and a current collector.

Japanese Unexamined Patent Application Publication (Translation of PCT Application) No. 2017-503323 (JP 2017-503323 A) discloses a method for producing a battery that includes the step of depositing a dielectric material layer on a lithium metal electrode.

SUMMARY

A problem with lithium secondary batteries using a lithium metal, a lithium alloy, etc. as a negative electrode active material is reduction in capacity retention rate due to the irreversible reaction of the lithium metal, and improvement in capacity retention rate is desired.

The present disclosure provides a negative electrode capable of improving the capacity retention rate of lithium secondary batteries.

A negative electrode for a lithium secondary battery according to a first aspect of the present disclosure includes a negative electrode current collector and a negative electrode layer.
The negative electrode layer includes a dielectric particle and a negative electrode active material including either or both of a lithium metal and a lithium alloy.

In the negative electrode according to the first aspect of the present disclosure, the dielectric particle may be in contact with at least a part of the negative electrode current collector.

In the negative electrode according to the first aspect of the present disclosure, the dielectric particle may be a complex oxide having a crystal structure of $AO_2$, $ABO_3$, $A_2B_4O_7$, or $(AA')B_4O_{12}$.

In the negative electrode according to the first aspect of the present disclosure, in the complex oxide, A and A' each may be at least one of elements selected from the group consisting of alkali metal elements, alkaline earth metal elements, rare earth metal elements, titanium (Ti), copper (Cu), lead (Pb), and bismuth (Bi), and B may be at least one of elements selected from the group consisting of Sn and transition metal elements.

In the negative electrode according to the first aspect of the present disclosure, the complex oxide may be any one of $SrTiO_3$, $BaTiO_3$, $BiFeO_3$, $CaCuTi_4O_{12}$, $NaNbO_3$, $Sr_2Ta_2O_7$, $KNbO_3$, $PbZrO_3$, $Ba_{0.7}La_{0.3}TiO_3$, $BaMn_{0.3}TiO_{0.7}O_3$, $BaCo_{0.3}Ti_{0.7}O_3$, $BaHfO_3$, $TiO_2$, $Ba_{0.2}Sr_{0.8}TiO_3$, and $Ba_{0.5}Sr_{0.5}TiO_3$.

In the negative electrode according to the first aspect of the present disclosure, the dielectric particle may have a relative dielectric constant of 10 to 600.

In the negative electrode according to the first aspect of the present disclosure, a ratio of a sectional area occupied by the dielectric particle to a sectional area of the negative electrode layer may be 0.001% to 40% in a cut surface of the negative electrode layer.

The present disclosure can provide a negative electrode capable of improving the capacity retention rate of lithium secondary batteries.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Hereinafter, an embodiment according to the present disclosure will be described. It should be noted that matters other than those specifically mentioned in the present specification and necessary to carry out the present disclosure (e.g., a general configuration and production process of a lithium-ion secondary battery that do not characterize the present disclosure and a general configuration and production process of a negative electrode that do not characterize the present disclosure) may be regarded as design matters of those skilled in the art based on known techniques in the art. The present disclosure may be carried out based on the content disclosed in the present specification and the common general technical knowledge in the art.

The dimensional relationships (such as length, width, and thickness) in the drawings do not reflect the actual dimensional relationships.

In the present specification, a hyphen "-" or word "to" indicating a numerical range is used to mean an inclusive range in which the numerical values before and after "-" or "to" are included as its lower and upper limit values. Any combination of values can be used as upper and lower limit values of a numerical range.

A negative electrode of the present disclosure includes a negative electrode current collector and a negative electrode layer.

The negative electrode layer is a negative electrode for a lithium secondary battery. The negative electrode layer includes a dielectric particle and a negative electrode active material including either or both of a lithium metal and a lithium alloy.

As in JP 2021-077640 A, dendrite growth in a negative electrode such as a surface of a current collector or inside an Li metal layer due to Li deposition can be reduced by adding a third element that lowers an overvoltage during Li deposition. The dielectric particle in the present disclosure is a dielectric material (insulating material), and usually hinders the Li deposition reaction, increases the overvoltage during Li deposition, increases the battery resistance, and is expected to reduce the capacity retention rate (cycle characteristics) due to accelerated dendrite growth. Therefore, the idea of adding a dielectric material to the negative electrode had conventionally not been considered.

On the other hand, it was confirmed that, contrary to expectations, adding the dielectric particle selected in the present disclosure to the negative electrode reduced the battery resistance and improved the capacity retention rate of the battery due to reduction in dendrite growth.

An Li metal complexed with a dielectric material can improve the liquid retention properties for an electrolyte solution, although its mechanism is unknown. Therefore, usage of the electrolyte solution can be reduced.

Negative Electrode

The negative electrode of the present disclosure includes a negative electrode current collector and a negative electrode layer.

Negative Electrode Current Collector

The material of the negative electrode current collector may be a material that does not alloy with Li, and is, for example, stainless steel (SS), copper, or nickel. The negative electrode current collector is in the form of, for example, foil or a plate. The shape of the negative electrode current collector as viewed in plan is not particularly limited, but may be, for example, a circle, an ellipse, a rectangle, or any desired polygon. The thickness of the negative electrode current collector varies depending on the shape of the negative electrode current collector, but may be, for example, in the range of 1 μm to 50 μm or in the range of 5 μm to 20 μm.

Negative Electrode Layer

The negative electrode layer contains a dielectric particle and contains either or both of a lithium metal and a lithium alloy as a negative electrode active material. The negative electrode active material includes either or both of a lithium metal and a lithium alloy, and may be a lithium metal. The lithium alloy used herein may be any of lithium alloys similar to those that will be mentioned later as examples for a positive electrode active material.

The negative electrode layer of the present disclosure may further contain other known negative electrode active material(s) as long as the negative electrode layer contains, as a main component, either or both of a lithium metal and a lithium alloy as a negative electrode active material. In the present disclosure, the "main component" means a component contained in an amount of 50% by mass or more when the total mass of the negative electrode layer is 100% by mass.

The dielectric particle may be in contact with at least a part of the negative electrode current collector. When the negative electrode layer contains a plurality of dielectric particles, at least one of the dielectric particles may be in contact with at least a part of the negative electrode current collector.

Examples of a method for bringing dielectric particles into contact with at least a part of a negative electrode current collector include a method in which dielectric particles are vacuum-deposited on one surface of a negative electrode current collector, and a method in which an Li metal and dielectric particles are simultaneously vacuum-deposited on one surface of a negative electrode current collector, An example of a method for simultaneously vacuum-depositing an Li metal and dielectric particles on one surface of a negative electrode current collector is a method in which a crucible containing an Li metal and a crucible containing dielectric particles are prepared and the crucibles are heated by electron beam heating or a resistance heating method so that the Li metal and the dielectric particles are simultaneously volatilized in a vacuum deposition apparatus and deposited on a negative electrode current collector.

As a method for suppressing dielectric particles from coming into contact with a negative electrode current collector, an Li metal may first be vacuum-deposited on one surface of a negative electrode current collector, and the Li metal and dielectric particles may then be simultaneously vacuum-deposited on the surface of the negative electrode current collector having the Li metal deposited thereon.

As a method for bringing dielectric particles into contact with a negative electrode current collector so that there are no dielectric particles that are not in contact with the negative electrode current collector, an Li metal and dielectric particles may first be simultaneously vacuum-deposited on one surface of a negative electrode current collector, and the Li metal may then be vacuum-deposited on the surface of the negative electrode current collector having the Li metal and the dielectric particles simultaneously vapor-deposited thereon.

The positions where the dielectric particles are to be located and the amount of the dielectric particles can be controlled by controlling the temperature in the crucibles, the deposition time, etc.

The dielectric particles may have a relative dielectric constant of 5 to 700 or 10 to 600.

From the standpoint of reducing usage of the electrolyte solution, the ratio of the sectional area occupied by the dielectric particles to the sectional area of the negative electrode layer when the negative electrode layer is cut may be 0.001% to 50% or 0.005% to 40% when the sectional area of the negative electrode layer is 100%, This ratio may be 0.01% to 40%. The direction in which the negative electrode layer is cut is not limited to a specific direction. For example, the negative electrode layer may be cut in the thickness direction of the negative electrode layer, may be cut in a direction that forms a predetermined angle with the thickness direction of the negative electrode layer, or may be cut in a direction in which the negative electrode layer extends.

The dielectric particles may be a complex oxide having a crystal structure of $AO_2$, $ABO_3$, $A_2B_2O_7$, or $(AA')B_4O_{12}$.

In the complex oxide, A and A' each may be at least one element selected from the group consisting of alkali metal elements, alkaline earth metal elements, rare earth metal elements, titanium (Ti), copper (Cu), lead (Pb), and bismuth (Bi), and B may be one or more of transition metal elements and tin (Sn).

Examples of the complex oxide include $SrTiO_3$, $BaTiO_3$, $BiFeO_3$, $CaCuTi_4O_{12}$, $NaNbO_3$, $Sr_2Ta_2O_7$, $KNbO_3$, $PbZrO_3$, $Ba_{0.7}La_{0.3}TiO_3$, $BaMn_{0.3}Ti_{0.7}O_3$, $BaCo_{0.3}Ti_{0.7}O_3$, $BaHfO_3$, $TiO_2$, $Ba_{0.2}Sr_{0.8}TiO_3$, and $Ba_{0.5}Sr_{0.5}TiO_3$.

The thickness of the negative electrode layer is not particularly limited, but may be, for example, 10 μm to 100 μm.

An example of a method for forming a negative electrode layer is a method in which a negative electrode active material and dielectric particles are simultaneously or separately vacuum-deposited on a negative electrode current collector.

The negative electrode of the present disclosure is a negative electrode for a lithium secondary battery.

A lithium secondary battery of the present disclosure includes a positive electrode layer, a negative electrode layer, and an electrolyte layer located between the positive electrode layer and the negative electrode layer. The lithium secondary battery of the present disclosure uses the deposition and dissolution reactions of a lithium metal as reactions of a negative electrode.

In the present disclosure, the "lithium secondary battery" refers to a battery that uses the deposition and dissolution reactions of a lithium metal as reactions of a negative electrode.

Figure 1:
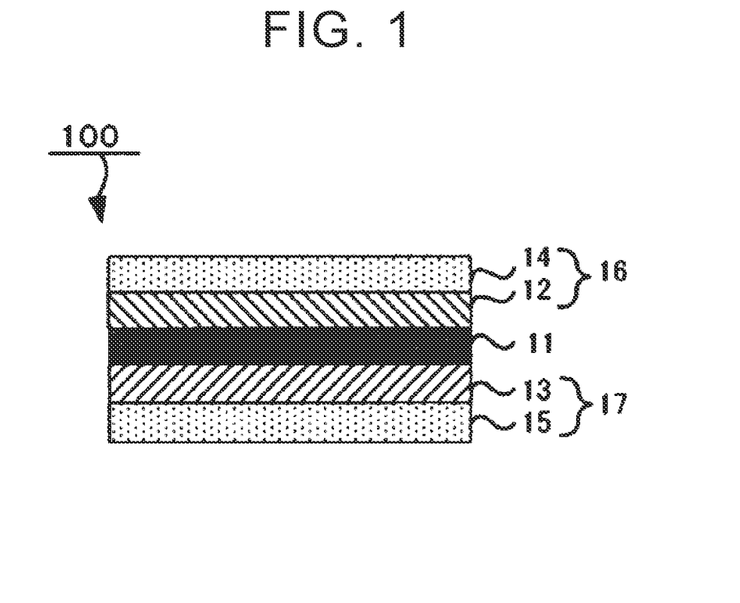
FIG. 1 is a schematic sectional view showing an example of a lithium secondary battery of the present disclosure.

FIG. 1 is a sectional view showing an example of the lithium secondary battery of the present disclosure.

As shown in FIG. 1, a lithium secondary battery 100 includes: a positive electrode 16 including a positive electrode layer 12 and a positive electrode current collector 14; a negative electrode 17 including a negative electrode layer 13 and a negative electrode current collector 15; and an electrolyte layer 11 located between the positive electrode layer 12 and the negative electrode layer 13.

Figure 2:
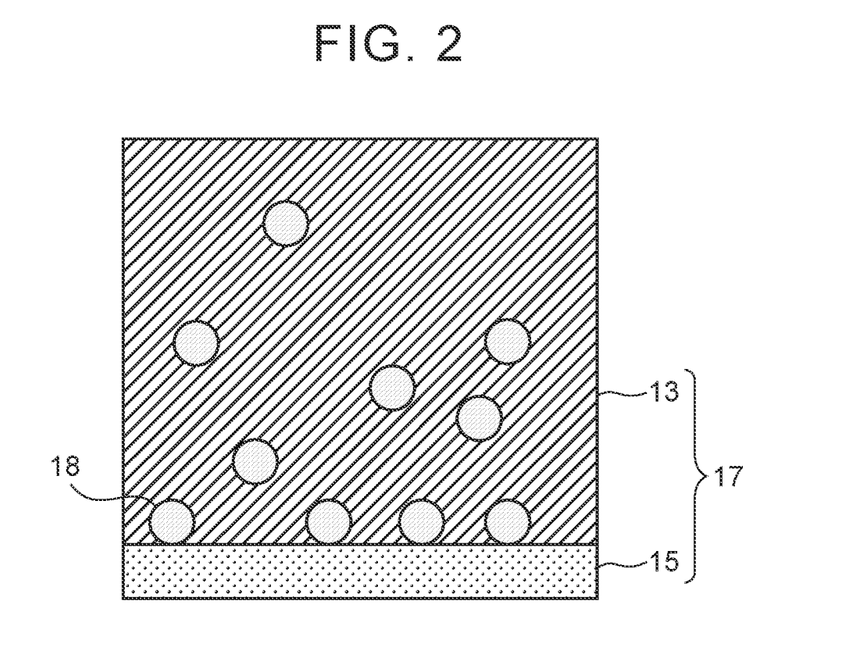
FIG. 2 is a schematic sectional view showing an example of a negative electrode of the lithium secondary battery of the present disclosure.

FIG. 2 is a schematic sectional view showing an example of the negative electrode 17 of the lithium secondary battery of the present disclosure, the negative electrode 17 including the negative electrode current collector 15 and the negative electrode layer 13.

As shown in FIG. 2, at least one dielectric particle 18 is in contact with at least a part of the negative electrode current collector 15.

Positive Electrode

The positive electrode includes a positive electrode layer and a positive electrode current collector.

Positive Electrode Layer

The positive electrode layer contains a positive electrode active material, and may contain a solid electrolyte, an electrically conductive material, a binding agent (binder), etc. as optional components.

There is no particular limitation on the type of positive electrode active material, and any material that can be used as an active material for lithium secondary batteries can be used. Examples of the positive electrode active material include a lithium metal (Li), a lithium alloy, $LiCoO_2$, $LiNi_{0.8}Co_{0.15}Al_{0.05}O_2$, $LiNi_xCo_{1-x}O_2$ (0<x<1), $LiNi_{1/3}Co_{1/3}Mn_{1/3}O_2$, a heteroelement-substituted Li—Mn spinel, a lithium titanate, a lithium metal phosphate, LiCoN, $Li_2SiO_3$, $Li_4SiO_4$, a transition metal oxide, $TiS_2$, Si, $SiO_2$, a silicon (Si) alloy, and a lithium-storable intermetallic compound. Examples of the heteroelement-substituted Li—Mn spinel include $LiMn_{1.5}Ni_{0.5}O_4$, $LiMn_{1.5}Al_{0.5}O_4$, $LiMn_{1.5}Mg_{0.5}O_4$, $LiMn_{1.5}Co_{0.5}O_4$, $LiMn_{1.5}Fe_{0.5}O_4$, and $LiMn_{1.5}Zn_{0.5}O_4$. An example of the lithium titanate is $Li_4Ti_5O_{12}$. Examples of the lithium metal phosphate include $LiFePO_4$, $LiMnPO_4$, $LiCoPO_4$, and $LiNiPO_4$. Examples of the transition metal oxide include $V_2O_5$ and $MoO_3$. Examples of the lithium-storable intermetallic compound include $Mg_2Sn$, $Mg_2Ge$, $Mg_2Sb$, and $Cu_3Sb$.

Examples of the lithium alloy include Li—Au, Li—Mg, Li—Sn, Li—Si, Li—Al, Li—B, Li—C, Li—Ca, Li—Ga, Li—Ge, Li—As, Li—Se, Li—Ru, Li—Rh, Li—Pd, Li—Ag, Li—Cd, Li—In, Li—Sb, Li—Ir, Li—Pt, Li—Hg, Li—Pb, Li—Bi, Li—Zn, Li—Tl, Li—Te, and Li—At. Examples of the Si alloy include alloys of Si and a metal such as Li. The Si alloy may be an alloy of Si and at least one metal selected from the group consisting of tin (Sn), germanium (Ge), and aluminum (Al).

The form of the positive electrode active material is not particularly limited, but the positive electrode active material may be in the form of particles. When the positive electrode active material is in the form of particles, the positive electrode active material may be in the form of primary particles or secondary particles.

A coating layer containing an Li-ion conductive oxide may be formed on a surface of the positive electrode active material. This is because the coating layer can reduce the reaction between the positive electrode active material and the solid electrolyte.

Examples of the Li-ion conductive oxide include $LiNbO_3$, $Li_4Ti_5O_{12}$, and $Li_3PO_4$. The thickness of the coating layer is, for example, 0.1 nm or more, and may be 1 nm or more. The thickness of the coating layer is, for example, 100 nm or less, and may be 20 nm or less. The coating layer may cover, for example, 70% or more of the surface of the positive electrode active material, or may cover 90% or more of the surface of the positive electrode active material.

Examples of the solid electrolyte are similar to solid electrolytes that will be mentioned later as examples for the solid electrolyte layer.

The electrically conductive material can be a known electrically conductive material. Examples of the electrically conductive material include a carbon material and metal particles. Examples of the carbon material include at least one selected from the group consisting of acetylene black, furnace black, vapor grown carbon fibers (VGCF), carbon nanotubes, and carbon nanofibers. Among all, the carbon material may be at least one selected from the group consisting of VGCF, carbon nanotubes, and carbon nanofibers from the standpoint of electron conduction properties. Examples of the metal particles include particles of nickel (Ni), copper (Cu), iron (Fe), and stainless steel (SS). The content of the electrically conductive material in the positive electrode layer is not particularly limited.

Examples of the binding agent (binder) include acrylonitrile butadiene rubber (ABR), butadiene rubber (BR), polyvinylidene fluoride (PVDF), and styrene butadiene rubber (SBR). The content of the binder in the positive electrode layer is not particularly limited.

The thickness of the positive electrode layer is not particularly limited, but may be, for example, 10 μm to 100 μm or 10 μm to 20 μm.

The positive electrode layer can be formed by a known method.

For example, the positive electrode layer can be formed by adding a positive electrode active material and, as necessary, other component(s) to a solvent and stirring the resultant mixture to produce a positive electrode layer forming paste, and applying the paste to one surface of a support and drying the paste.

Examples of the solvent include butyl acetate, butyl butyrate, mesitylene, tetralin, heptane, and N-methyl-2-pyrrolidone (NMP).

A method for applying a positive electrode layer forming paste to one surface of a support is not particularly limited, and examples of this method include a doctor blade method, a metal mask printing method, an electrostatic spraying method, a dip coating method, a spray coating method, a roll coating method, and a gravure coating method, and a screen printing method.

A support having self-supporting properties can be selected as appropriate and used as the support. The support is not particularly limited, and can be, for example, metal foil such as Cu or Al.

Another method for forming a positive electrode layer is a method in which a positive electrode layer is formed by pressure-forming a powder of a positive electrode mixture including a positive electrode active material and, as necessary, other component(s). In the case of pressure-forming a powder of a positive electrode mixture, a press pressure of about 1 MPa or more and about 2000 MPa or less is usually applied to the powder.

The pressing method is not particularly limited, but is for example, a method in which a pressure is applied using a flat plate press, a roll press, etc.

Positive Electrode Current Collector

The positive electrode current collector can be a known metal that can be used as a current collector for lithium secondary batteries. Examples of such a metal include metal materials containing one or more elements selected from the group consisting of copper (Cu), nickel (Ni), aluminum (Al), vanadium (V), gold (Au), platinum (Pt), magnesium (Mg), iron (Fe), titanium (Ti), cobalt (Co), chromium (Cr), zinc (Zn), germanium (Ge), and indium (In). Examples of the positive electrode current collector include stainless steel (SS), aluminum, nickel, iron, titanium, and carbon.

The form of the positive electrode current collector is not particularly limited, and the positive electrode current collector may be in various forms such as foil and mesh. The thickness of the positive electrode current collector varies depending on the shape of the positive electrode current collector, but may be, for example, in the range of 1 μm to 50 μm or in the range of 5 μm to 20 μm.

Electrolyte Layer

The electrolyte layer contains at least an electrolyte.

The electrolyte can be an aqueous electrolyte solution, a non-aqueous electrolyte solution, a gel electrolyte, a solid electrolyte, etc. One of these electrolytes may be used alone, or two or more of these electrolytes may be used in combination.

The solvent of the aqueous electrolyte solution contains water as a main component. That is, water may account for 50 mol % or more, particularly 70 mol % or more, more particularly 90 mol % or more of the total amount of the solvent (liquid component) (100 mol %) of the electrolyte solution. The upper limit of the content of water in the solvent is not particularly limited.

The solvent contains water as a main component. However, the solvent may contain a solvent other than water. The solvent other than water is, for example, one or more selected from ethers, carbonates, nitrites, alcohols, ketones, amines, amides, sulfur compounds, and hydrocarbons. The solvent other than water may account for 50 mol % or less, particularly 30 mol % or less, more particularly 10 mol % or less of the total amount of the solvent (liquid component) (100 mol %) of the electrolyte solution.

The aqueous electrolyte solution used in the present disclosure contains an electrolyte. The electrolyte for the aqueous electrolyte solution can be a known electrolyte. Examples of the electrolyte include lithium salts, nitrates, acetates, sulfates, etc. of imidic acid compounds. Specific examples of the electrolyte include lithium bis(fluorosulfonyl)imide (LiFSI; CAS No. 171611-11-3), lithium bis(trifluoromethanesulfonyl)imide (LiTFSI; CAS No. 90076-65-6), and lithium bis(pentafluoroethanesulfonyl)imide (LiBETI; CAS No. 132843-44-8), lithium bis(nonafluorobutanesulfonyl)imide (CAS No. 119229-99-1), lithium nonafluoro-N-[trifluoromethane)sulfonyl]butanesulfonylamide (CAS No. 176719-70-3), lithium N,N-hexafluoro-1,3-disulfonylimide (CAS No. 189217-62-7), $CH_3COOLi$, $LiPF_6$, $LiBF_4$, $Li_2SO_4$, and $LiNO_3$.

The concentration of the electrolyte in the aqueous electrolyte solution can be set as appropriate within a range that does not exceed the saturation concentration of the electrolyte with respect to the solvent, according to desired battery characteristics. This is because, if a solid electrolyte remains in an aqueous electrolyte solution, the solid may inhibit battery reactions.

For example, when LiTFSI is used as the electrolyte, the aqueous electrolyte solution may contain 1 mol or more, particularly 5 mol or more, more particularly 7.5 mol or more of LiTFSI per kilogram of water. The upper limit of the concentration of the electrolyte is not particularly limited, and may be, for example, 25 mol or less.

The non-aqueous electrolyte solution used herein is usually an electrolyte solution containing a lithium salt and a non-aqueous solvent.

Examples of the lithium salt include: inorganic lithium salts such as $LiPF_6$, $LiBF_4$, $LiClO_4$, and $LiAsF_6$; and organic lithium salts such as $LiCF_3SO_3$, $LiN(SO_2CF_3)_2$(Li-TFSI), $LiN(SO_2C_2F_5)_2$, and $LiC(SO_2CF_3)_3$.

Examples of the non-aqueous solvent include ethylene carbonate (EC), propylene carbonate (PC), butylene carbonate (BC), dimethyl carbonate (DMC), diethyl carbonate (DEC), ethyl methyl carbonate (EMC), γ-butyrolactone, sulfolane, acetonitrile (AcN), dimethoxymethane, 1,2-dimethoxyethane (DME), 1,3-dimethoxypropane, diethyl ether, tetraethylene glycol dimethyl ether (TEGDME), tetrahydrofuran, 2-methyl tetrahydrofuran, dimethyl sulfoxide (DMSO), and mixtures thereof. From the standpoint of ensuring a high dielectric constant and low viscosity, the non-aqueous solvent may be a mixture of a cyclic carbonate compound having a high dielectric constant and high viscosity such as EC, PC, or BC and a chain carbonate compound having a low dielectric constant and low viscosity such as DMC, DEC, or EMC, or may be a mixture of EC and DEC.

The concentration of the lithium salt in the non-aqueous electrolyte solution may be, for example, 0.3 M to 5 M.

The gel electrolyte is usually an electrolyte obtained by adding a polymer to a non-aqueous electrolyte solution for gelation.

Specifically, the gel electrolyte is obtained by adding a polymer such as polyethylene oxide, polypropylene oxide, polyacrylonitrile, polyvinylidene fluoride (PVDF), polyurethane, polyacrylate, or cellulose to the above non-aqueous electrolyte solution for gelation.

A separator that is impregnated with an electrolyte such as the above aqueous electrolyte solution and that suppresses the positive electrode layer and the negative electrode layer from contacting each other may be used in the electrolyte layer.

The material of the separator is not particularly limited as long as it is a porous film. Examples of the material of the separator include resins such as polyethylene (PE), polypropylene (PP), polyester, polyvinyl alcohol, cellulose, and polyamide. Among all, the material of the separator may be polyethylene and polypropylene. The separator may have a single-layer structure or a multi-layer structure. Examples of the separator having a multi-layer structure include a separator having a two-layer structure of PE/PP, and a separator having a three-layer structure of PP/PE/PP or PE/PP/PE.
The separator may be a non-woven fabric such as resin non-woven fabric or glass fiber non-woven fabric.

Solid Electrolyte Layer

The electrolyte layer may be a solid electrolyte layer composed of a solid. The solid electrolyte layer contains at least a solid electrolyte.
A known solid electrolyte that can be used in all-solid-state batteries can be used as appropriate as the solid electrolyte contained in the solid electrolyte layer. Examples of such a solid electrolyte include inorganic solid electrolytes such as sulfide-based solid electrolyte, oxide-based solid electrolyte, hydride-based solid electrolyte, halide-based solid electrolyte, and nitride-based solid electrolyte. The sulfide-based solid electrolyte may contain sulfur (S) as a main component of an anionic element. The oxide-based solid electrolyte may contain oxygen (O) as a main component of an anionic element. The hydride-based solid electrolyte may contain hydrogen (H) as a main component of an anionic element. The halide-based solid electrolyte may contain halogen (X) as a main component of an anionic element. The nitride-based solid electrolyte may contain nitrogen (N) as a main component of an anionic element.

The sulfide-based solid electrolyte may be sulfide glass, crystallized sulfide glass (glass ceramic), or a crystalline material that is obtained by performing a solid-phase reaction process on a raw material composition.
The crystal state of the sulfide-based solid electrolyte can be checked by, for example, performing powder X-ray diffraction measurement of the sulfide-based solid electrolyte using CuK α radiation.

Sulfide glass can be obtained by amorphizing a raw material composition (e.g., a mixture of $Li_2S$ and $P_2S_5$). An example of the amorphization process is mechanical milling.

A glass ceramic can be obtained by, for example, heat-treating sulfide glass.
The heat treatment temperature need only be higher than the crystallization temperature (Tc) observed by thermal analysis measurement of sulfide glass, and is usually 195° C. or higher. The upper limit of the heat treatment temperature is not particularly limited.
The crystallization temperature (Tc) of sulfide glass can be measured by differential thermal analysis (DTA).
The heat treatment time is not particularly limited as long as desired crystallinity of glass ceramic can be obtained. For example, the heat treatment time is in the range of one minute to 24 hours, and particularly in the range of one minute to 10 hours.
The method of the heat treatment is not particularly limited, but is, for example, a method using a firing furnace.

An example of the oxide-based solid electrolyte is a solid electrolyte containing Li element, Y element (Y is at least one of the following elements: niobium (Nb), boron (B), aluminum (Al), silicon (Si), phosphorus (P), titanium (Ti), zirconium (Zr), molybdenum (Mo), tungsten (W), and sulfur (S)), and oxide (O) element. Specific examples of the oxide-based solid electrolyte include: garnet solid electrolytes such as $Li_{17}La_3Zr_2O_{12}$, $Li_{7-x}La_3(Zr_{2-x}Nb_x)O_{12}$ ($0 \leq x \leq 2$), and $Li_5La_3Nb_2O_{12}$; perovskite solid electrolytes such as (Li, La)$TiO_3$, (Li, La)$NbO_3$, and (Li, Sr)(Ta, Zr)$O_3$; NASICON solid electrolytes such as Li(Al, Ti)(PO$_4$)$_3$ and Li(Al, Ga)(PO$_4$)$_3$; Li—P—O-based solid electrolytes such as $Li_3PO_4$ and LIPON (compound $Li_3PO_4$ having a part of O substituted with nitrogen (N)); and Li—B—O-based solid electrolytes such as $Li_3BO_3$ and compound $Li_3BO_3$ having a part of O substituted with carbon (C).

The hydride-based solid electrolyte contains, for example, Li and a complex anion containing hydrogen. Examples of the complex anion include $(BH_4)^-$, $(NH_2)^-$; and $(AlH_4)^-$, and $(AlH_6)^{3-}$.

An example of the halide-based solid electrolyte is $Li_{6-3z}Y_zX_6$ (X is either or both of chlorine (Cl) and bromine (Br), and z satisfies 0<z<2).

An examples of the nitride-based solid electrolyte is $Li_3N$.
The solid electrolyte may be in the form of particles from the standpoint of their excellent handleability.
The average particle size of the particles of the solid electrolyte is not particularly limited, but is, for example, 10 nm or more, and may be 100 nm or more. The average particle size of the particles of the solid electrolyte is, for example, 25 μm or less, and may be 10 μm or less.

In the present disclosure, the average particle size of particles is a value of a volume-based median diameter (D50) measured by laser diffraction and scattering particle size distribution measurement, unless otherwise specified. In the present disclosure, the median diameter (D50) is a diameter (volume mean diameter) that splits the cumulative volume size distribution of particles with half above and half below this diameter (50%) when particles are arranged from the particle having the smallest particle size to the particle having the biggest particle size.

One solid electrolyte may be used alone, or two or more solid electrolytes may be used in combination. When two or more solid electrolytes are used, the two or more solid electrolytes may be mixed, or a multi-layer structure composed of two or more layers of the individual electrolytes may be formed.

The proportion of the solid electrolyte in the solid electrolyte layer is not particularly limited, but is, for example, 50% by mass or more, and may be 60% by mass or more and 100% by mass or less, may be 70% by mass or more and 100% by mass or less, or may be 100% by mass.

The solid electrolyte layer may contain a binding agent from the standpoint of causing the solid electrolyte layer to exhibit plasticity etc. Examples of such a binding agent are the materials mentioned as examples of the binding agent for the positive electrode layer. The solid electrolyte layer may contain 5% by mass or less of the binding agent from the standpoint of, for example, suppressing excessive agglomeration of the solid electrolyte and enabling formation of a solid electrolyte layer having a uniformly dispersed solid electrolyte in order to facilitate an increase in output power.

The thickness of the solid electrolyte layer is not particularly limited, and is usually 0.1 μm or more and 1 mm or less.

Examples of a method for forming a solid electrolyte layer include a method in which a solid electrolyte layer forming paste containing a solid electrolyte is applied to a support and dried, and a method in which a powder of a solid electrolyte material including a solid electrolyte is pressure-formed. Examples of the support are similar to the examples of the support mentioned above for the positive electrode layer. In the case of pressure-forming a powder of a solid electrolyte material, a press pressure of about 1 MPa or more and about 2000 MPa or less is usually applied to the powder.

The pressing method is not particularly limited, but examples of the pressuring method are the methods mentioned above as examples for formation of the positive electrode layer.

The lithium secondary battery includes, as necessary, an exterior body that houses a stack of a positive electrode, an electrolyte layer, and a negative electrode, etc.

The material of the exterior body is not particularly limited as long as it is stable against an electrolyte. Examples of the material of the exterior body include resins such as polypropylene, polyethylene, and acrylic resin.

The lithium secondary battery may be, for example, an aqueous lithium secondary battery, a non-aqueous lithium secondary battery, or an all-solid-state lithium secondary battery.

Examples of the shape of the lithium secondary battery include a coin, a laminate, a cylinder, and a quadrilateral prism.

Applications of the lithium secondary battery are not particularly limited, but include, for example, power supplies for vehicles such as hybrid electric vehicles ((HEVs), plug-in hybrid electric vehicles (PHEVs), battery electric vehicles (BEVs), gasoline vehicles, and diesel vehicles. The lithium secondary battery may be used particularly for traction power supplies for hybrid electric vehicles, plug-in hybrid electric vehicles, or battery electric vehicles. The lithium secondary battery according to the present disclosure may be used as power supplies for moving bodies other than vehicles (e.g., trains, ships, and aircrafts), or may be used as power supplies for electrical products such as information processing devices.

In a method for producing a lithium secondary battery according to the present disclosure, for example, a positive electrode layer is first formed by pressure-forming a powder of a positive electrode mixture including a positive electrode active material containing lithium element on one surface of a positive electrode current collector. A positive electrode is thus obtained. Thereafter, a negative electrode active material and dielectric particles are simultaneously or separately vacuum-deposited on a negative electrode current collector to form a negative electrode layer on one surface of the negative electrode current collector. A negative electrode is thus obtained. Subsequently, a separator is prepared. The separator is placed between the positive electrode and the negative electrode, and an electrolyte solution is injected into the separator. The lithium secondary battery of the present disclosure may be produced in this manner.

Comparative Example 1

Production of Positive Electrode

As a positive electrode active material, particles of a lithium-nickel-cobalt-manganese complex oxide (layered structure, $LiNi_{0.33}Co_{0.33}Mn_{0.33}O_2$) having an average particle size of 10 μm, acetylene black (AB) as an electrically conductive material, and polyvinylidene fluoride (PVDF) as a binder were weighed to the following mass ratio: positive electrode active material:AB:PVDF=80:8:2. Next, these materials were mixed in N-methyl-2-pyrrolidone (NMP) to a solid content of 56% by mass by using a planetary mixer to prepare a positive electrode layer forming slurry. This positive electrode layer forming slurry was applied to a strip of aluminum foil (positive electrode current collector) in the longitudinal direction of the aluminum foil by using a die coater, and dried at 120° C. The dried positive electrode layer forming slurry was pressed together with the aluminum foil. A strip-like positive electrode having a positive electrode layer on a positive electrode current collector was thus produced.

Production of Negative Electrode

An Li metal was volatilized in a vacuum deposition apparatus and deposited on Cu foil (negative electrode current collector) to produce a strip-like negative electrode having a negative electrode layer containing an Li metal on a negative electrode current collector. Placement of Separator A wound electrode assembly was produced by placing the produced positive and negative electrodes so that the positive and negative electrodes face each other with a strip-like separator (three-layer structure of PP/PE/PP) therebetween and winding the resultant stack in the longitudinal direction. Thereafter, a positive electrode current collecting member was welded to the positive electrode, and a negative electrode current collecting member was welded to the negative electrode.

Preparation of Electrolyte Solution

A non-aqueous electrolyte solution was prepared by dissolving $LiPF_6$ as a supporting salt at a concentration of 1.0 M in a mixed solvent containing ethylene carbonate (EC) and dimethyl carbonate (DMC) at a volume ratio of 1:1.

The wound electrode body produced as described above and the non-aqueous electrolyte solution were housed in a battery case. A lithium secondary battery was thus assembled.

Example 1

A lithium secondary battery was assembled by a method similar to that of Comparative Example 1 except for the following points.

In the above section "Production of Negative Electrode," a crucible containing an Li metal and a crucible containing $SrTiO_3$ particles (relative dielectric constant: 150) as dielectric particles were prepared, and the crucibles were heated by electron beam heating to simultaneously vaporize the Li metal and the dielectric particles in a vacuum deposition apparatus and deposit the Li metal and the dielectric particles on Cu foil (negative electrode current collector). A strip-like negative electrode including a negative electrode layer containing an Li metal and dielectric particles on a negative electrode current collector was thus produced. The positions where the dielectric particles were to be located and the deposition amount of the dielectric particles were controlled by controlling the temperature in the crucibles, the deposition time, etc.

(1) The position where the dielectric particles were to be located was controlled so that there would be dielectric particles in contact with at least a part of the negative electrode current collector.

(2) The position where the dielectric particles were to be located was controlled so that there would be no dielectric particles that were not in contact with the negative electrode current collector and that were included in the negative electrode layer.

The deposition amount of the dielectric particles was controlled so that the ratio of the sectional area occupied by the dielectric particles to the sectional area of the negative electrode layer when the negative electrode layer was cut (100×sectional area of the dielectric particles/sectional area of the negative electrode layer) was 0.01% when the sectional area of the negative electrode layer was 100%.

Examples 2 to 13

In Examples 2 to 13, as shown in Table 1, a lithium secondary battery was assembled by a method similar to that of Example 1 except for the type of dielectric particles used.

Example 14

A lithium secondary battery was assembled by a method similar to that of Example 1 except for the following points. In the above section "Production of Negative Electrode," (1) the position where the dielectric particles were to be located was controlled so that there would be no dielectric particles in contact with at least a part of the negative electrode current collector. (2) The position where the dielectric particles were to be located was controlled so that there would be dielectric particles that were not in contact with the negative electrode current collector and that were included in the negative electrode layer.

Example 15

A lithium secondary battery was assembled by a method similar to that of Example 1 except for the following points. In the above section "Production of Negative Electrode," (2) the position where the dielectric particles were to be located was controlled so that there would be dielectric particles that were not in contact with the negative electrode current collector and that were included in the negative electrode layer. The deposition amount of the dielectric particles was controlled so that the ratio of the sectional area occupied by the dielectric particles to the sectional area of the negative electrode layer when the negative electrode layer was cut (100×sectional area of the dielectric particles/sectional area of the negative electrode layer) was 0.02% when the sectional area of the negative electrode layer was 100%. Example 15 is the same as Example 1 in that (1) the position where the dielectric particles were to be located was controlled so that there would be dielectric particles in contact with at least a part of the negative electrode current collector.

Examples 16 to 18

A lithium secondary battery was assembled by a method similar to that of Example 1 except for the following point. In the above section "Production of Negative Electrode," as shown in Table 3, $SrTiO_3$ particles having a different relative dielectric constant were used as dielectric particles (Example 16: relative dielectric constant of 5, Example 17: relative dielectric constant of 50, Example 18: relative dielectric constant of 200). The relative dielectric constant of the dielectric particles was controlled by controlling the sintering temperature of the dielectric particles.

Example 19

A lithium secondary battery was assembled by a method similar to that of Example 1 except for the following point. In the above section "Production of Negative Electrode," as shown in Table 3, $Ba_{0.2}Sr_{0.8}TiO_3$ particles (relative dielectric constant: 600) were used as dielectric particles. The relative dielectric constant of the dielectric particles was controlled by controlling the sintering temperature of the dielectric particles.

Example 20

A lithium secondary battery was assembled by a method similar to that of Example 1 except for the following point. In the above section "Production of Negative Electrode," as shown in Table 3, $Ba_{0.5}Sr_{0.5}TiO_3$ particles (relative dielectric constant: 700) were used as dielectric particles. The relative dielectric constant of the dielectric particles was controlled by controlling the sintering temperature of the dielectric particles.

Examples 21 to 27

A lithium secondary battery was assembled by a method similar to that of Example 1 except for the following points. In the above section "Production of Negative Electrode," as shown in Table 4, (2) the position where the dielectric particles were to be located was controlled so that there would be dielectric particles that were not in contact with the negative electrode current collector and that were included in the negative electrode layer.
The deposition amount of the dielectric particles was controlled so that the ratio of the sectional area occupied by the dielectric particles to the sectional area of the negative electrode layer when the negative electrode layer was cut (100×sectional area of the dielectric particles/sectional area of the negative electrode layer) was 0.005% for Example 21, 0.1% for Example 23, 10% for Example 24, 20% for Example 25, 40% for Example 26, and 50% for Example 27 when the sectional area of the negative electrode layer was 100%. Examples 21 to 27 are the same as Example 1 in that (1) the position where the dielectric particles were to be located was controlled so that there would be dielectric particles in contact with at least a part of the negative electrode current collector. Example 22 is the same as Example 1 in that the ratio of the sectional area occupied by the dielectric particles to the sectional area of the negative electrode layer when the negative electrode layer was cut (100×sectional area of the dielectric particles/sectional area of the negative electrode layer) was 0.01% when the sectional area of the negative electrode layer was 100%.

Evaluation of Output Characteristics

The voltage (open-circuit voltage) of the lithium secondary battery was adjusted to 3.70 V in advance. The lithium secondary battery was then discharged at 5 C for eight seconds in a temperature environment of −5° C. As used herein, "1 C," means a current value capable of charging the battery capacity (Ah) predicted from the theoretical capacity of the active material in one hour. A voltage drop ΔV at this time was acquired, and a resistance value was calculated using the following expression (1).

$$\text{resistance} = \Delta V / \text{current value of 5C} \qquad \text{Expression (1)}$$

Tables 1 to 4 show the calculation results of the battery resistances of Examples 1 to 27 with respect to the battery resistance of Comparative Example 1, where the battery resistance of Comparative Example 1 was standardized to 1.0. Upward arrows in the tables mean the "same as above."

Evaluation of Capacity Retention Rate

A cycle test was performed on the lithium secondary batteries in an environment of 60° C. in the voltage range of 3.3 V to 4.2 V. Charging and discharging were performed by a constant current method at a current rate of IC.

The lithium secondary batteries produced as described above were charged with a constant current (CC) at a rate of 1 C in an environment of 60° C. until the voltage reached 4.2 V, and then charged with a constant voltage (CV) until the current reached 1/50 C. Thereafter, the lithium secondary batteries were discharged with a constant current (CC) at a rate of 1 C until the voltage reached 3.3 V. The discharge capacity at this time was taken as an initial discharge capacity.

The discharge capacity at the 200th cycle of the cycle test was measured by the same method as that for the initial discharge capacity, and the capacity retention rate after the charge and discharge cycle was calculated by dividing the discharge capacity at the 200th cycle of the cycle test by the initial discharge capacity. The results are shown in Tables 1 to 4.

Evaluation of Capacity Retention Rate with Reduced Amount of Electrolyte Solution For the lithium secondary batteries of Examples 1 to 15 and 21 to 27 and Comparative Example 1 produced by reducing the amount of electrolyte solution by a predetermined amount, the capacity retention rate after the charge and discharge cycle with the reduced amount of electrolyte solution was calculated in a similar manner. The results are shown in Tables 1, 2, and 4.

TABLE 1

| | Type of Dielectric Material | Position of Dielectric Material: (1) Dielectric Material in Contact with Current Collector | Position of Dielectric Material: (2) Dielectric Material Not in Contact with Current Collector and Existing in Negative Electrode Layer | 100 × Sectional Area of Dielectric Material/ Sectional Area of Negative Electrode Layer (%) | Standardized Battery Resistance | Capacity Retention Rate After Charge and Discharge Cycle (%) | Capacity Retention Rate After Charge and Discharge Cycle with Reduced Amount of Electrolyte Solution (%) |
|---|---|---|---|---|---|---|---|
| Comparative Example 1 | N/A | — | — | 0 | 1.0 | 50.0 | 40.3 |
| Example 1 | $SrTiO_3$ | Present | Not Present | 0.01 | 0.6 | 84.1 | 81.8 |
| Example 2 | $BaTiO_3$ | ↑ | ↑ | ↑ | 0.6 | 84.2 | 82.1 |
| Example 3 | $BiFeO_3$ | ↑ | ↑ | ↑ | 0.7 | 84.2 | 81.4 |
| Example 4 | $CaCuTi_4O_{12}$ | ↑ | ↑ | ↑ | 0.6 | 84.1 | 81.5 |
| Example 5 | $NaNbO_3$ | ↑ | ↑ | ↑ | 0.6 | 84.2 | 81.4 |
| Example 6 | $Sr_2Ta_2O_7$ | ↑ | ↑ | ↑ | 0.7 | 81.4 | 81.9 |
| Example 7 | $KNbO_3$ | ↑ | ↑ | ↑ | 0.6 | 84.0 | 81.8 |
| Example 8 | $PbZrO_3$ | ↑ | ↑ | ↑ | 0.6 | 84.1 | 81.4 |
| Example 9 | $Ba_{0.7}La_{0.3}, TiO_3$ | ↑ | ↑ | ↑ | 0.6 | 84.1 | 81.5 |
| Example 10 | $BaMn_{0.3}Ti_{0.7}O_3$ | ↑ | ↑ | ↑ | 0.6 | 84.1 | 81.6 |
| Example 11 | $BaCo_{0.2}Ti_{0.7}O_3$ | ↑ | ↑ | ↑ | 0.6 | 84.0 | 81.7 |
| Example 12 | $BaHfO_3$ | ↑ | ↑ | ↑ | 0.6 | 84.0 | 81.7 |
| Example 13 | $TiO_2$ | ↑ | ↑ | ↑ | 0.7 | 84.2 | 81.2 |

TABLE 2

| | Type of Dielectric Material | Position of Dielectric Material: (1) Dielectric Material in Contact with Current Collector | Position of Dielectric Material: (2) Dielectric Material Not in Contact with Current Collector and Existing in Negative Electrode Layer | 100 × Sectional Area of Dielectric Material/ Sectional Area of Negative Electrode Layer (%) | Standardized Battery Resistance | Capacity Retention Rate After Charge and Discharge Cycle (%) | Capacity Retention Rate After Charge and Discharge Cycle with Reduced Amount of Electrolyte Solution (%) |
|---|---|---|---|---|---|---|---|
| Comparative Example 1 | N/A | — | — | 0 | 1.00 | 50.00 | 40.30 |
| Example 1 | $SrTiO_3$ | Present | Not Present | 0.01 | 0.64 | 84.09 | 81.80 |
| Example 14 | $SrTiO_3$ | Not Present | Present | ↑ | 0.91 | 64.09 | 55.20 |
| Example 15 | $SrTiO_3$ | Present | Present | 0.02 | 0.54 | 89.50 | 88.30 |

TABLE 3

| | Type of Dielectric Material | Position of Dielectric Material: (1) Dielectric Material in Contact with Current Collector | Position of Dielectric Material: (2) Dielectric Material Not in Contact with Current Collector and Existing in Negative Electrode Layer | Relative Dielectric Constant | 100 × Sectional Area of Dielectric Material/Sectional Area of Negative Electrode Layer (%) | Standardized Battery Resistance | Capacity Retention Rate After Charge and Discharge Cycle (%) |
|---|---|---|---|---|---|---|---|
| Comparative Example 1 | N/A | — | — | — | 0 | 1 | 50 |
| Example 16 | $SrTiO_3$ (Low Sintering Temperature) | Present | Not Present | 5 | 0.1 | 0.79 | 75.1 |
| Example 17 | $SrTiO_3$ (Medium Sintering Temperature) | Present | Not Present | 50 | ↑ | 0.66 | 85.1 |
| Example 18 | $SrTiO_3$ (High Sintering Temperature) | Present | Not Present | 200 | ↑ | 0.68 | 84.8 |
| Example 19 | $Ba_{0.2}Sr_{0.8}TiO_3$ (High Sintering Temperature) | Present | Not Present | 600 | ↑ | 0.69 | 84.6 |
| Example 20 | $Ba_{0.5}Sr_{0.5}TiO_3$ (High Sintering Temperature) | Present | Not Present | 700 | ↑ | 0.81 | 74.3 |

TABLE 4

| | Type of Dielectric Material | Position of Dielectric Material: (1) Dielectric Material in Contact with Current Collector | Position of Dielectric Material: (2) Dielectric Material Not in Contact with Current Collector and Existing in Negative Electrode Layer | 100 × Sectional Area of Dielectric Material/Sectional Area of Negative Electrode Layer % | Standardized Battery Resistance | Capacity Retention Rate After Charge and Discharge Cycle (%) | Capacity Retention Rate After Charge and Discharge Cycle with Reduced Amount of Electrolyte Solution (%) |
|---|---|---|---|---|---|---|---|
| Example 21 | $SrTiO_3$ | Present | Present | 0.005 | 0.81 | 73.2 | 63.9 |
| Example 22 | $SrTiO_3$ | ↑ | ↑ | 0.01 | 0.59 | 87.4 | 86.5 |
| Example 23 | $SrTiO_3$ | ↑ | ↑ | 0.1 | 0.63 | 87.3 | 86.3 |
| Example 24 | $SrTiO_3$ | ↑ | ↑ | 10 | 0.61 | 87.9 | 86.1 |
| Example 25 | $SrTiO_3$ | ↑ | ↑ | 20 | 0.65 | 87.5 | 86.6 |
| Example 26 | $SrTiO_3$ | ↑ | ↑ | 40 | 0.68 | 87.7 | 86.3 |
| Example 27 | $SrTiO_3$ | ↑ | ↑ | 50 | 0.82 | 74.2. | 64.1 |

Evaluation Results

The results shown in Tables 1 to 4 show that Examples 1 to 27 have a lower battery resistance and a higher capacity retention rate after the charge and discharge cycle than Comparative Example 1, and that Examples 1 to 15 and 21 to 27 have a higher capacity retention rate after the charge and discharge cycle with a reduced amount of electrolytic solution than Comparative Example 1.

The results shown in Table 2 show that Examples 1 and 15 have a lower battery resistance, a higher capacity retention rate after the charge and discharge cycle, and a higher capacity retention rate after the charge and discharge cycle with a reduced amount of electrolytic solution than Example 14. These results demonstrate that the capacity retention rate after the charge and discharge cycle is higher when there are dielectric particles in contact with at least a part of the negative electrode current collector than when there are no such dielectric particles in the negative electrode layer. These results demonstrate that the battery resistance is lower when there are dielectric particles in contact with at least a part of the negative electrode current collector than when there are no such dielectric particles in the negative electrode layer.

The results of Table 3 demonstrate that the battery resistance can further be reduced and the capacity retention rate after the charge and discharge cycle can further be improved by using dielectric particles having a relative dielectric constant within a predetermined range. The results of Table 4 demonstrate that the battery resistance can further be reduced and the capacity retention rate after the charge and discharge cycle can further be improved by adjusting the ratio of the sectional area occupied by the dielectric particles to the sectional area of the negative electrode layer when the negative electrode layer is cut (100×sectional area of the dielectric particles/sectional area of the negative electrode layer) when the sectional area of the negative electrode layer is 100% to a value within a predetermined range.

What is claimed is:

1. A negative electrode for a lithium secondary battery, the negative electrode comprising:
    a negative electrode current collector; and
    a negative electrode layer, wherein
    the negative electrode layer includes dielectric particles and a negative electrode active material including either or both of a lithium metal and a lithium alloy,
    wherein the dielectric particles are arranged in the negative electrode layer so as to have a first set of dielectric particles that are in contact with at least a part of the negative electrode current collector and a second set of dielectric particles that are not in contact with the negative electrode current collector but are within the negative electrode layer.

2. The negative electrode according to claim 1, wherein the dielectric particles comprise a complex oxide having a crystal structure of $AO_2$, $ABO_3$, $A_2B_2O_7$, or $(AA')B_4O_{12}$.

3. The negative electrode according to claim 2, wherein in the complex oxide, A and A' are each at least one of elements selected from the group consisting of alkali metal elements, alkaline earth metal elements, rare earth metal elements, Ti, Cu, Pb, and Bi, and B is at least one of elements selected from the group consisting of Sn and transition metal elements.

4. The negative electrode according to claim 2, wherein the complex oxide is any one of $SrTiO_3$, $BaTiO_3$, $BiFeO_3$, $CaCuTi_4O_{12}$, $NaNbO_3$, $Sr_2Ta_2O_7$, $KNbO_3$, $PbZrO_3$, $Ba_{0.7}La_{0.3}TiO_3$, $BaMn_{0.3}Ti_{0.7}O_3$, $BaCo_{0.3}Ti_{0.7}O_3$, $BaHfO_3$, $TiO_2$, $Ba_{0.2}Sr_{0.8}TiO_3$, and $Ba_{0.5}Sr_{0.5}TiO_3$.

5. The negative electrode according to claim 1, wherein the dielectric particles have a relative dielectric constant of 10 to 600.

6. The negative electrode according to claim 1, wherein a ratio of a sectional area occupied by the dielectric particles to a sectional area of the negative electrode layer is 0.001% to 40% in a cut surface of the negative electrode layer.

7. A method of making the negative electrode for a lithium secondary battery according to claim 1, the method comprising
    simultaneously or separately vacuum-depositing the negative electrode active material and the dielectric particles on the negative electrode current collector to form the negative electrode layer on one surface of the negative electrode current collector, while controlling positions of the dielectric particles such that the dielectric particles are arranged in the negative electrode layer so as to have the first set of dielectric particles in contact with at least a part of the negative electrode current collector and the second set of dielectric particles not in contact with the negative electrode current collector but within the negative electrode layer.

* * * * *